United States Patent
Wang (10) Patent No.: US 6,795,256 B2
(45) Date of Patent: Sep. 21, 2004

(54) HAND-HELD ELECTRONIC APPLIANCE WITH OPTIONAL MAGNIFYING FUNCTION

(75) Inventor: Yu-Hsiang Wang, Taipei (TW)

(73) Assignee: Via Technologies, Inc. (TW)

( * ) Notice: Subject to any disclaimer, the term of this patent is extended or adjusted under 35 U.S.C. 154(b) by 0 days.

(21) Appl. No.: 10/251,346

(22) Filed: Sep. 20, 2002

(65) Prior Publication Data

US 2003/0234988 A1 Dec. 25, 2003

(30) Foreign Application Priority Data

Jun. 19, 2002 (TW) .................................. 91209181 U (51) Int. Cl.[7] .................... G02B 27/10; G02B 7/02
(52) U.S. Cl. ............................ 359/803; 359/822
(58) Field of Search ............................ 359/802, 803, 359/822

(56) References Cited

U.S. PATENT DOCUMENTS

| | | | | |
|---|---|---|---|---|
| 4,443,819 A | * | 4/1984 | Funada et al. | 348/794 |
| 5,119,239 A | * | 6/1992 | Iaquinto et al. | 359/811 |
| 5,130,853 A | * | 7/1992 | Sakurai | 359/803 |
| 5,883,860 A | * | 3/1999 | McKay | 368/10 |
| 6,233,102 B1 | * | 5/2001 | Hogan, Jr. | 359/802 |
| 6,653,919 B2 | * | 11/2003 | Shih-Chung et al. | 335/207 |

FOREIGN PATENT DOCUMENTS

TW          472896          6/2004

\* cited by examiner

*Primary Examiner*—Ricky Mack
(74) *Attorney, Agent, or Firm*—Madson & Metcalf (57) ABSTRACT

A hand-held electronic appliance is disclosed. The hand-held electronic appliance includes a main body, a connecting element and a magnifying device. The main body includes a display. The connecting element is coupled to the main body by a first end thereof and to the magnifying device by a second end thereof. In an operational mode, the magnifying device is switched to be positioned between the display and the user's eyes by operating the connecting element to magnify the image on the display to be observed by the user.

4 Claims, 8 Drawing Sheets

HAND-HELD ELECTRONIC APPLIANCE WITH OPTIONAL MAGNIFYING FUNCTION

FIELD OF THE INVENTION

The present invention relates to a hand-held electronic appliance, and particularly, to a hand-held electronic appliance with a magnifying device for magnifying the image on the display of the hand-held electronic appliance.

BACKGROUND OF THE INVENTION

As electronic technology advances, the size of an electronic appliance becomes increasingly compact. Especially, hand-held electronic appliances tend to be smaller and smaller and convenient to be carried with than ever. For example, Personal Digital Assistants (PDAs) and cell phones are popular because of their dainty features and lightness. Therefore, the producers always try their best to reduce the sizes of the electronic appliances.

A hand-held electronic appliance typically comprises at least two essential components, one of which is circuit elements used to control the functions of the hand-held electronic appliance, and the other is a display used to show the information to be revealed by the hand-held electronic appliance. Therefore, it is obvious that the size of a hand-held electronic appliance depends on the size of the circuit elements and/or the size of the display.

Figure 1:
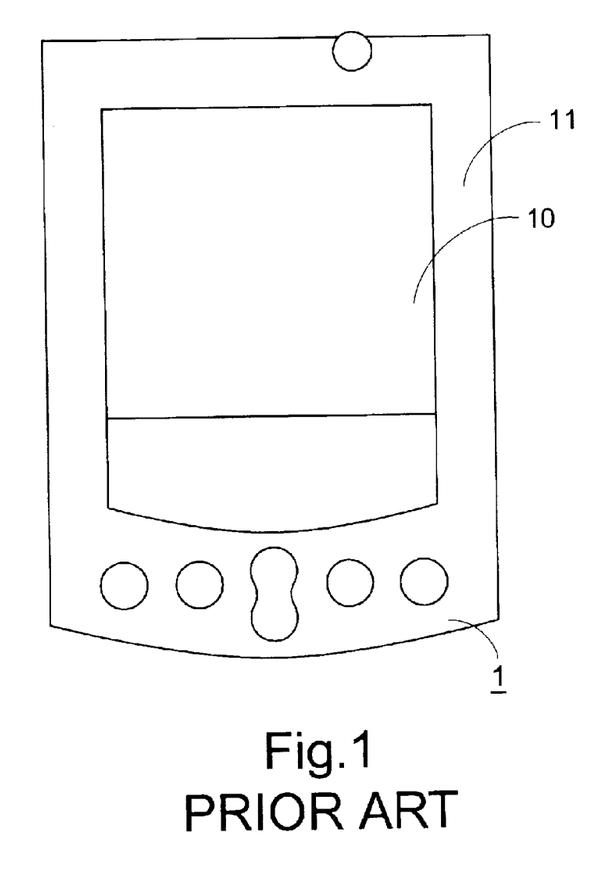
FIG. 1 is top view of an exemplified hand-held electronic appliance.

A Personal Digital Assistant (PDA), as a typical hand-held electronic appliance, is depicted in FIG. 1, which has a main body 1 including a plurality of circuit elements inside the housing 11 and a display 10 on the external surface of the housing 11. Nowadays, the space occupied by the circuit elements has been easily reduced to a significant extent. The display 10 of the hand-held electronic appliance, however, cannot be further minified in view of the limitation of the user's vision. In other words, the overall area of the hand-held electronic is unable to be minified without reducing the area of the display, even if the area of the circuit elements is minimized.

Therefore, an invention able to reduce the area of the display is the solution to minify the hand-held electronic.

SUMMARY OF THE INVENTION

An object of the present invention is to provide a hand-held electronic appliance with a minified but clear display.

In an aspect of the present invention, a hand-held electronic appliance having a small display comprises a main body, a connecting element and a magnifying device. The display is mounted on the main body. The connecting element is coupled to the main body by a first end thereof, and to the magnifying device by a second end thereof. In an operational mode, the magnifying device is switched to be positioned between the display and user's eyes to magnify the image on the display in order that the user can see the image clearly. By the use of the magnifying device, the size of the display can be reduced.

In an embodiment, the connecting element comprises a first link and a second link pivotally connected to each other. The first link and the second link are further pivotally connected to the main body and the magnifying device, respectively.

In another embodiment, each of the main body and the magnifying device includes a series of through holes, and the connecting element is an elongated helix strip penetrating through the through holes to be coupled with the main body and the magnifying device. In the operational mode, the connecting element, i.e. the elongated helix strip, allows the magnifying device to pivot to a position between the display and the user's eyes.

In another embodiment, the connecting element includes a flexible portion physically interfaced between the main body and the magnifying device. In the operational mode, the flexible portion is bent to have the magnifying device positioned between the display and the user's eyes.

In another embodiment, the connecting element includes slits and salient bumps. The slits respectively are arranged on outer surface of opposite sides of the main body, and the salient bumps respectively are fixed onto inner surface of opposite sides of the magnifying device. Alternatively, the slits are arranged onto inner surface of opposite sides of the magnifying device, and the salient bumps are fixed on outer surface of opposite sides of the main body. In the operational mode, the salient bumps slide along the slits to place the magnifying device between the display and user's eyes.

In another aspect of the present invention, a hand-held electronic appliance having a small screen comprises a main body with a first magnetic polarity and a magnifying device with a second magnetic polarity. The screen is mounted on the main body. The second magnetic polarity is in opposition to the first magnetic polarity so that, in an operational mode, the magnifying device can be attached to the main body by a magnetic force, and positioned between the screen and user's eyes. Because the user can observe the magnified image on the screen via the magnifying device, the size of the screen can be properly reduced.

For example, the hand-held electronic appliance can be a Personal Digital Assistant (PDA), a Pocket PC, a cell phone or an electronic dictionary.

Preferably, the magnifying device includes a convex lens. The size of the convex lens is smaller than the display and the convex lens is movable relative to the display.

BRIEF DESCRIPTION OF THE DRAWINGS

The present invention may best be understood through the following description with reference to the accompanying drawings, in which.

DETAILED DESCRIPTION OF THE PREFERRED EMBODIMENT

The present invention will now be described more specifically with reference to the following embodiments. It is to be noted that the following descriptions of preferred embodiments of this invention are presented herein for purpose of illustration and description only; it is not intended to be exhaustive or to be limited to the precise from disclosed.

Figure 2A:
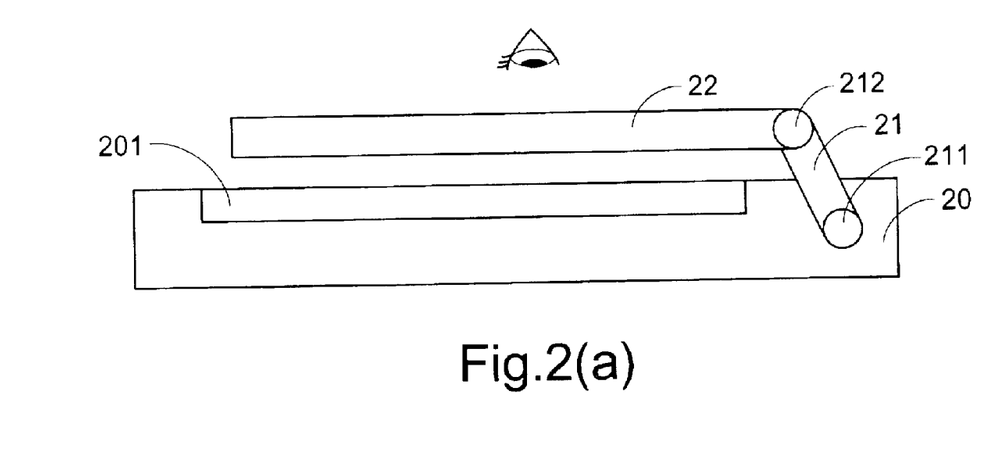
FIGS. 2(a) and 2(b) are side views illustrating a hand-held electronic appliance according to a first embodiment of the present invention.
Figure 2B:
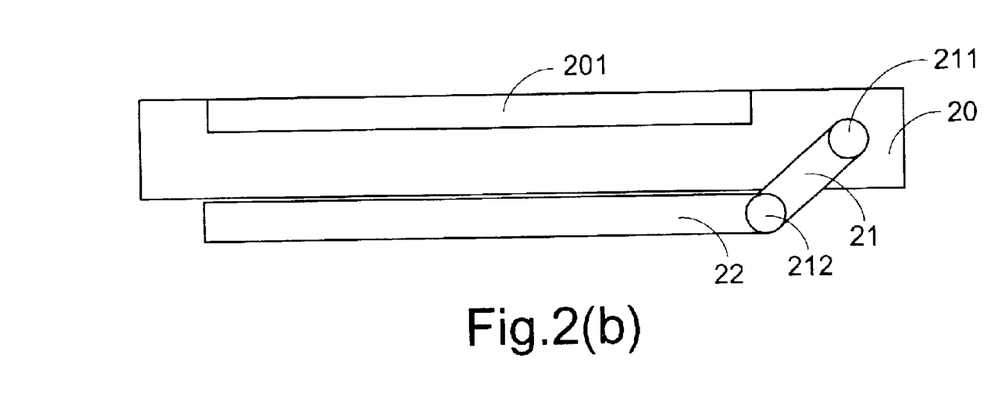

Please refer to FIGS. 2(a) and 2(b) which are side views of a hand-held electronic appliance according to an embodiment of the present invention. The hand-held electronic appliance includes a main body 20, a connecting element 21 and a magnifying device 22. The main body 20 has a display 201 to be observed by users. The connecting element 21 is pivotally coupled to the main body 20 by a first end 211 thereof, and to the magnifying device 22 by a second end 212 thereof. In an operational mode, the magnifying device 22 is positioned between the display 201 and the user's eyes. Therefore, the user can observe the image on the display 201 more clearly via the magnifying device 22. Since the image on the display 201 has been magnified, the size of the display 201 will not be that critical in view of the limitation of the user's vision. In other words, the overall area of the hand-held electronic appliance could be reduced due to the reduction of display size, and thus the hand-held electronic appliance of the present invention is convenient to be carried with. When the electronic appliance is not in use, the magnifying device 22 is pivoted about the ends 211 and 212 to be received under the main body 20, as shown in FIG. 2(b).

Figure 3:
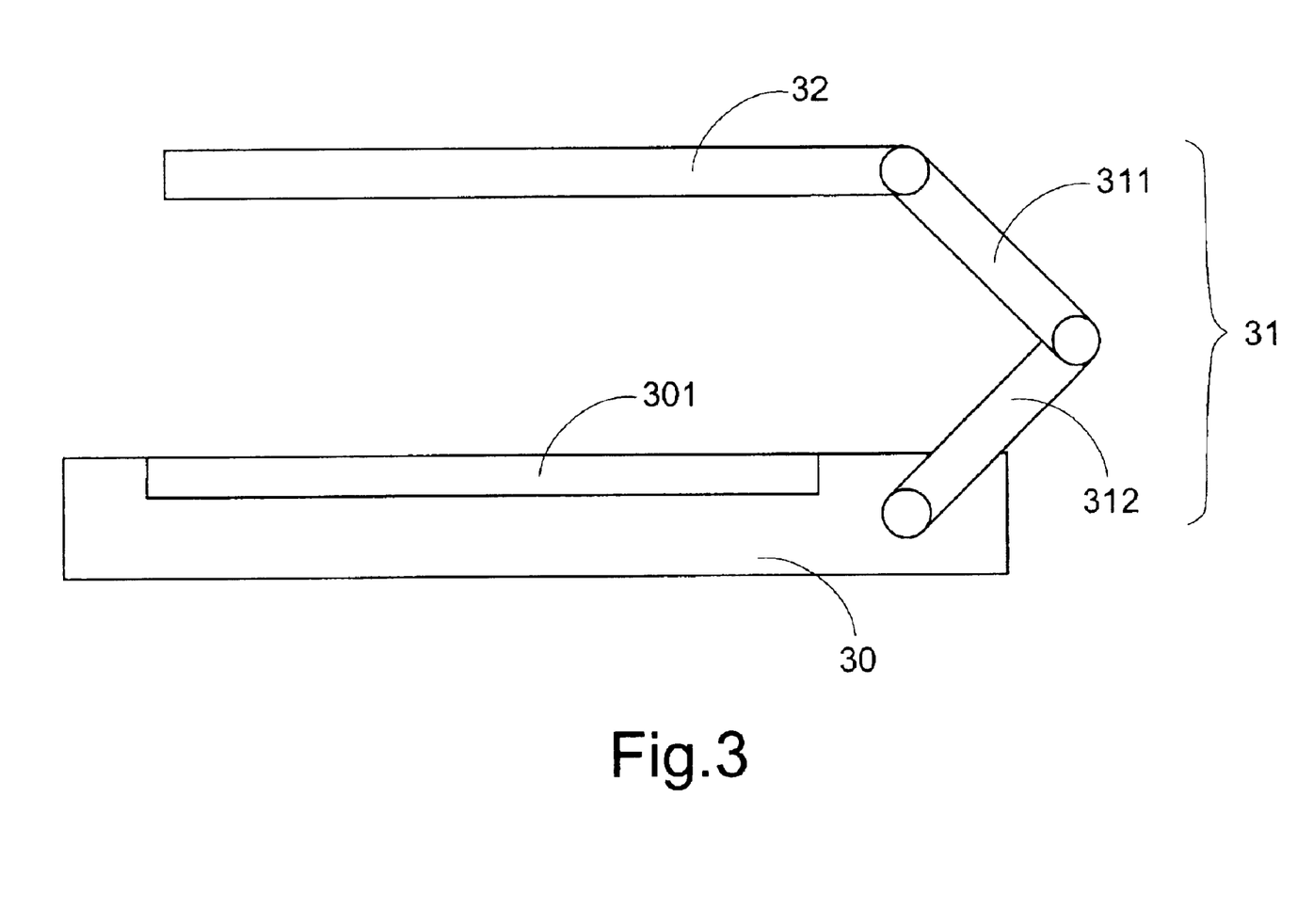
FIG. 3 is a side view of a hand-held electronic appliance according to a second embodiment of the present invention.

Please refer to FIG. 3, which is a side view of a hand-held electronic appliance according to another embodiment of the present invention. The hand-held electronic appliance comprises a main body 30, a connecting element 31 and a magnifying device 32. The connecting element 31 has a first link 311 and a second link 312. The first link 311 and the second link 312 are pivotally connected to each other and further pivotally connected to the main body 30 and the magnifying device 32, respectively. In the operational mode, the magnifying device 32 can be positioned between the user's eyes and the display 301 of the main body 30 by pivoting the first link 311 and/or the second link 312.

Figure 4:
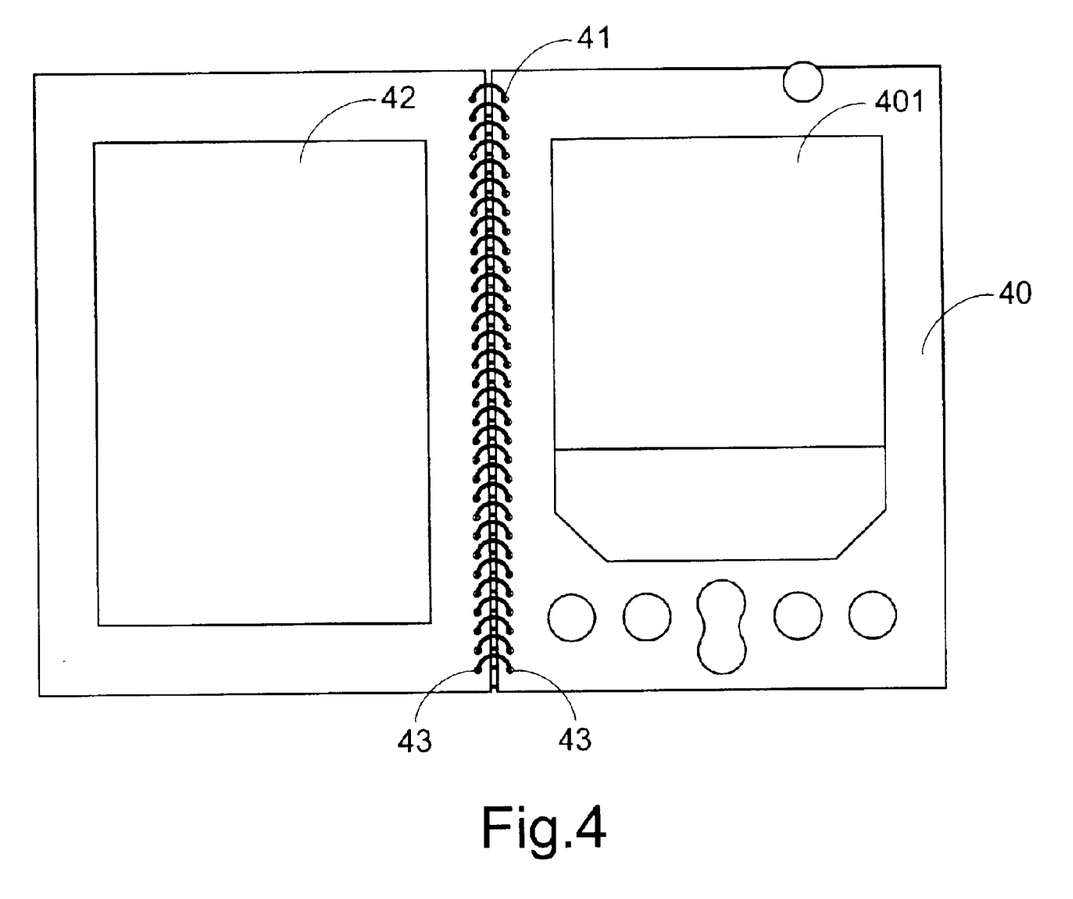
FIG. 4 is a top view of a hand-held electronic appliance according to a third embodiment of the present invention.

Please refer to FIG. 4, which is a top view of a hand-held electronic appliance according to another embodiment of the present invention. The hand-held electronic appliance comprises a main body 40, a connecting element 41 and a magnifying device 42. Each of the main body 40 and the magnifying device 42 include a series of through holes 43, and the connecting element 41 is an elongated helix stripe penetrating through the through holes 43 to have the main body 41 and the magnifying device 42 coupled with each other. In the operational mode, the magnifying device 42 pivots about the elongated helix stripe 41 to be positioned above the display 401 of the main body 40 to magnify the image.

Figure 5:
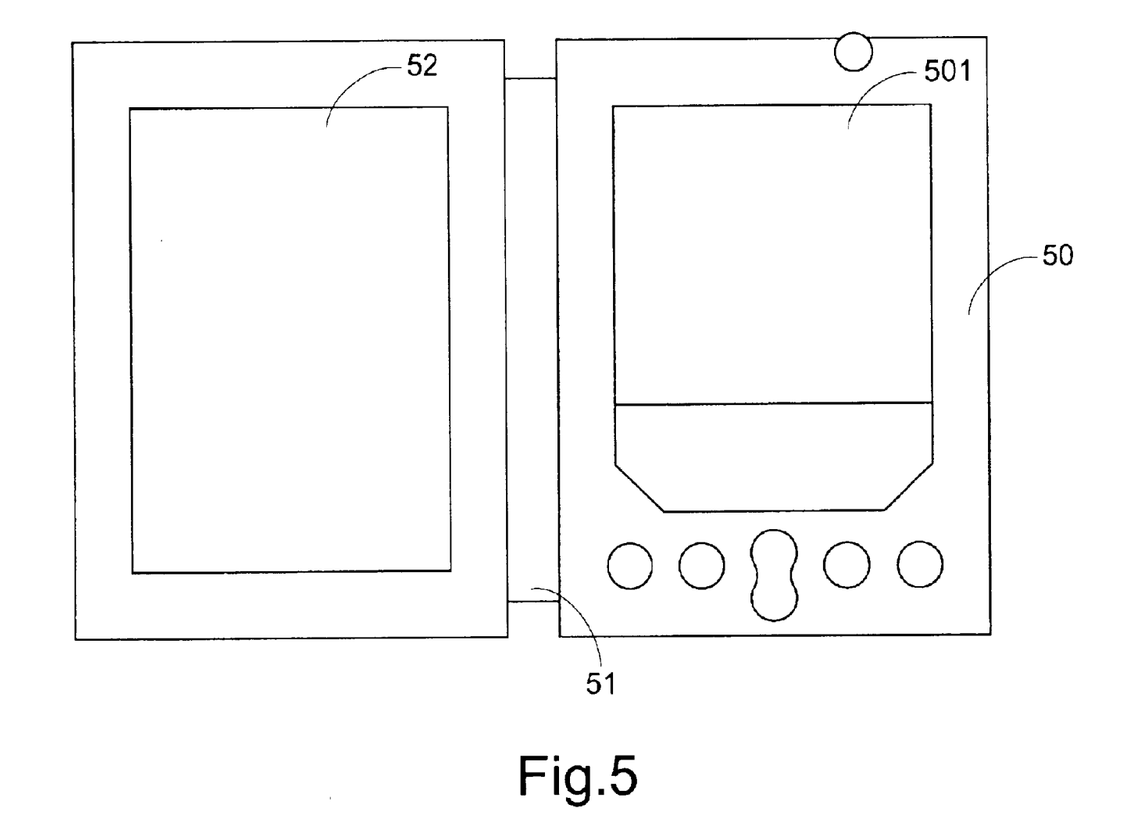
FIG. 5 is a top view of a hand-held electronic appliance according to a fourth embodiment of the present invention.

Please refer to FIG. 5, which is a top view of a hand-held electronic appliance according to another embodiment of the present invention. The hand-held electronic appliance comprises a main body 50, a connecting element 51 and a magnifying device 52. The connecting element 51 includes a flexible portion physically interfaced between the main body 50 and the magnifying device 52. For example, the flexible portion 51 can be made of leather or plastic, the same material as the protective cover of the electronic appliance. In the operational mode, the flexible portion of the connecting element 51 is bent to have the magnifying device 52 positioned above the display 501 of the main body 50 to magnify the image.

Figure 6:
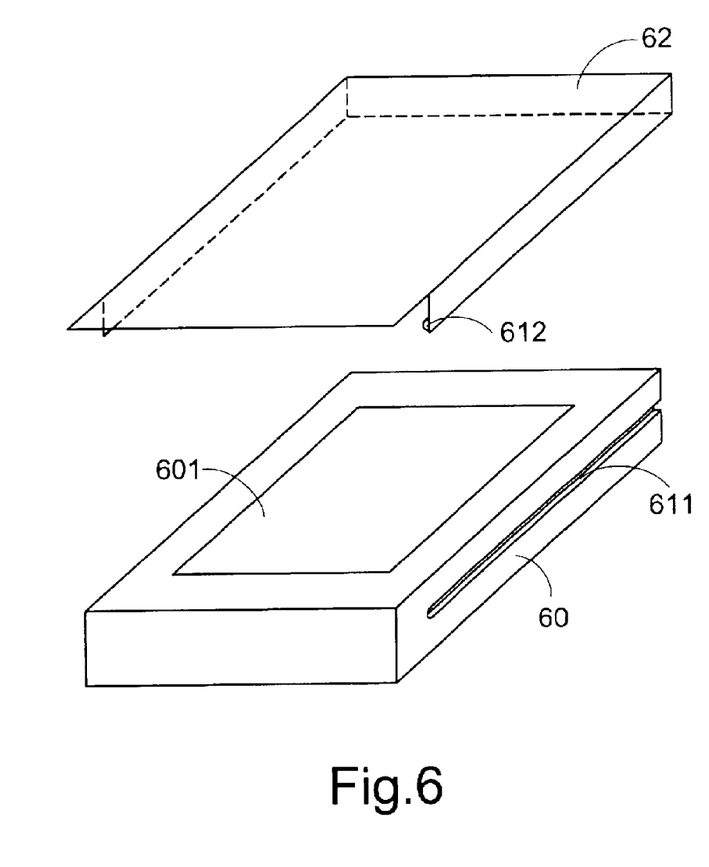
FIG. 6 is a schematic diagram showing a hand-held electronic appliance according to a fifth embodiment of the present invention.

Please refer to FIG. 6, which is a schematic diagram showing a hand-held electronic appliance according to another embodiment of the present invention. The hand-held electronic appliance comprises a main body 60, a connecting element and a magnifying device 62. The connecting element comprises slits 611 and salient bumps 612. The slits 611 are arranged on outer surfaces of opposite sides of the main body 60, and the salient bumps 612 are fixed onto inner surfaces of opposite sides of the magnifying device 62. In the operational mode, the salient bumps 612 slide along the slits 611 until the magnifying device 62 is positioned above the display 601 of the main body 60 where the user can observe the image in a magnified manner. Alternatively, the slits may be arranged onto inner surfaces of opposite sides of the magnifying device, and the salient bumps may be relatively fixed on outer surfaces of opposite sides of the main body to achieve the similar purpose.

Figure 7:
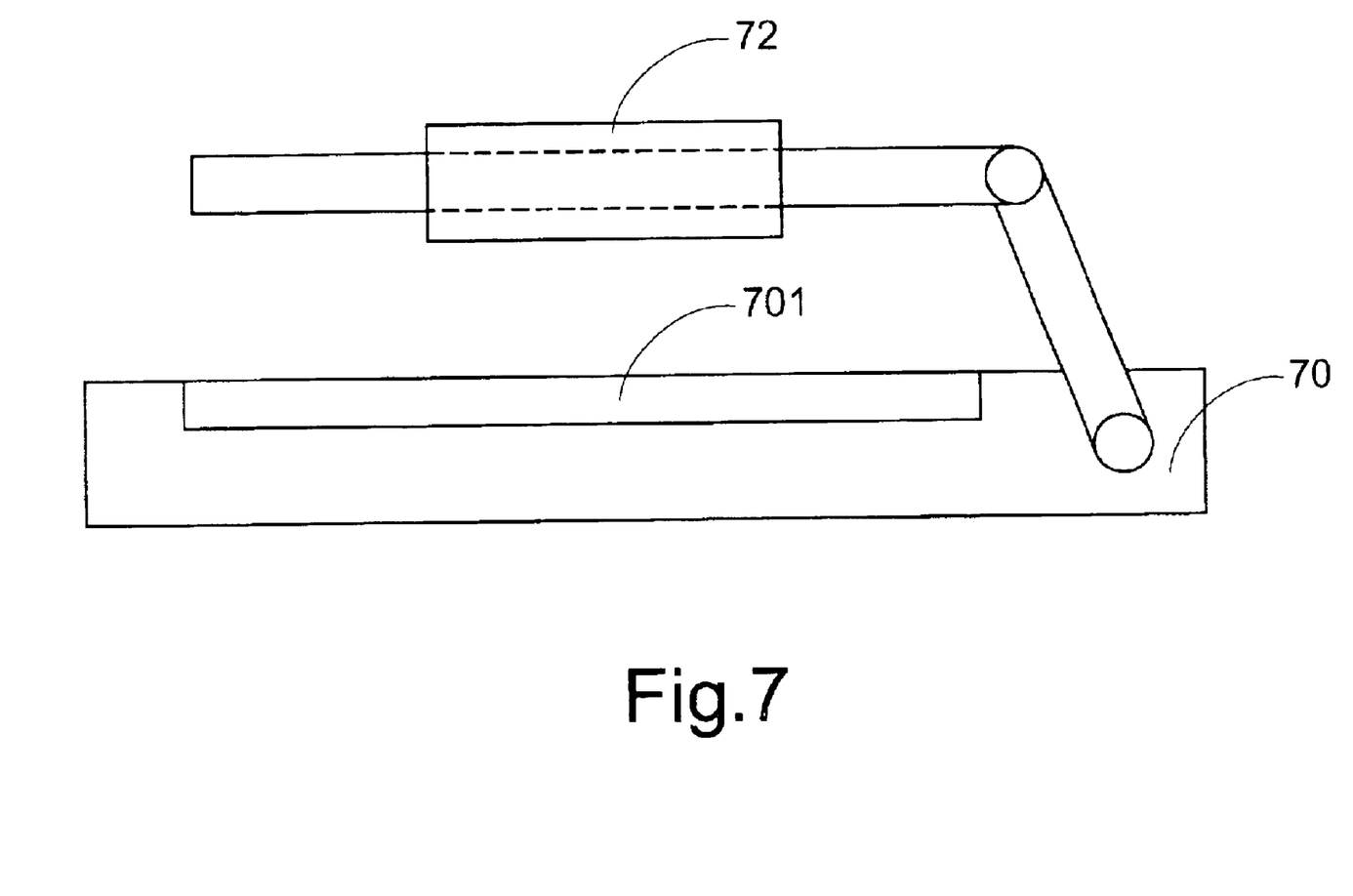
FIG. 7 is a side view of a hand-held electronic appliance according to a sixth embodiment of the present invention.

Usually, the magnifying device of the hand-held electronic appliance according to embodiments of the present invention includes a convex lens. In a further embodiment shown in FIG. 7, the size of the convex lens 72 is smaller than the display 701 of the main body 70. In the operational mode, the convex lens 72 is movable relative to the display 701 to a region to be observed.

Figure 8:
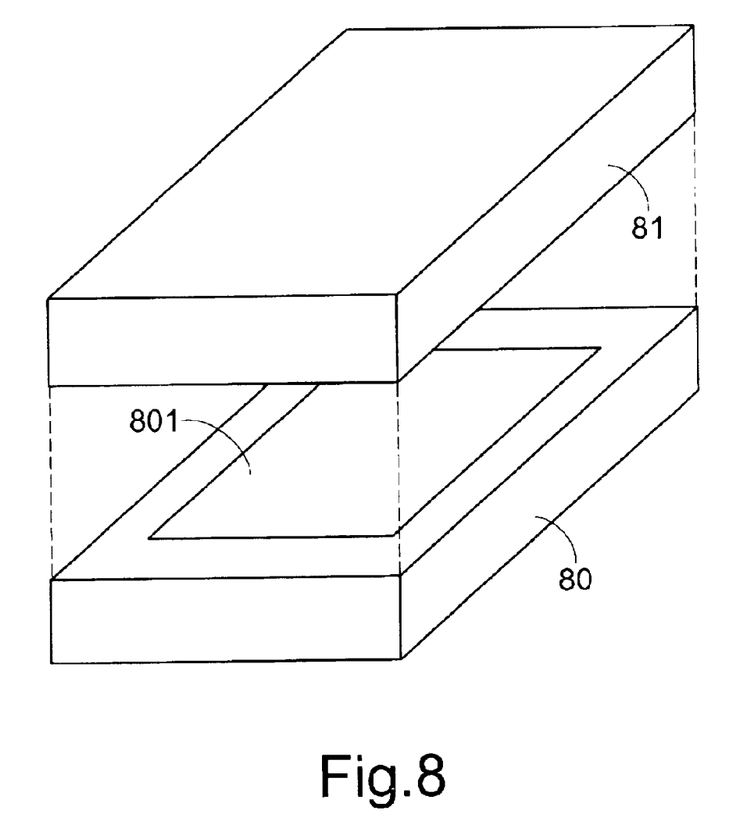
FIG. 8 is a schematic diagram showing a hand-held electronic appliance according to a seventh embodiment of the present invention.

Please refer to FIG. 8, which is a schematic diagram showing a hand-held electronic appliance according to a further embodiment of the present invention. The hand-held electronic appliance includes a main body 80 and a magnifying device 81. The main body 80 includes a screen 801, and has a first magnetic polarity arranged on a proper position thereon. The magnifying device 81 has a second magnetic polarity arranged on a proper position thereon and the second magnetic polarity is in opposition to the first magnetic polarity. Therefore, there is a magnetic force between the main body 80 and the magnifying device 81 when the magnifying device 81 approaches the main body 80. In the operational mode, the magnifying device 81 is attached to the main body 80 by the magnetic force to magnify the image on the screen 801.

The kind of the hand-held electronic appliance according to the present invention is not limited. For example, it can be selected from a group consisting of a Personal Digital Assistant (PDA), a Pocket PC, a cell phone and an electronic dictionary, etc.

To sum up, the hand-held electronic appliance according to the present invention has a magnifying device to magnify the image of the display/screen to be observed by users, so that the size of the display can be reduced to the minimum size without limitation of the user's vision. In other words, the overall area of the hand-held electronic is able to be minified because the area of the display is reduced.

While the invention has been described in terms of what are presently considered to be the most practical and preferred embodiments, it is to be understood that the invention needs not be limited to the disclosed embodiments. On the contrary, it is intended to cover various modifications and similar arrangements included within the spirit and scope of the appended claims which are to be accorded with the broadest interpretation so as to encompass all such modifications and similar structures.

What is claimed is:

1. A hand-held electronic appliance, comprising:

a main body including a display thereon;

a connecting element coupled to said main body; and a magnifying device coupled to a second end of said connecting element, and switched to be positioned between said display and user's eyes to magnify the image on said display to be observed by the user in an operational mode of said magnifying device, wherein said convex lens has a size smaller than said display and is movable on said connecting element to view different regions of said display in said operational mode of said magnifying device.

2. The hand-held electronic appliance according to claim 1 wherein said hand-held electronic appliance is selected from a group consisting of a Personal Digital Assistant (PDA), a Pocket PC, a cell phone and an electronic dictionary.

3. The hand-held electronic appliance according to claim 1 wherein said connecting element is pivotally connected to said main body.

4. The hand-held electronic appliance according to claim 1 wherein said connecting element comprises a first link pivotally connected to said main body, and a second link pivotally connected to said first link and coupled to said convex lens for said convex to move thereon.

* * * * *